(12) United States Patent
Kass et al.

(10) Patent No.: US 9,164,744 B2
(45) Date of Patent: Oct. 20, 2015

(54) METHOD AND SYSTEM FOR PROGRAM BUILDING

(71) Applicant: International Business Machines Corporation, Armonk, NY (US)

(72) Inventors: Eric R. Kass, Mannheim (DE); Stefan B. Sell, Magstadt (DE)

(73) Assignee: International Busines Machines Corporation, Armonk, NY (US)

(*) Notice: Subject to any disclaimer, the term of this patent is extended or adjusted under 35 U.S.C. 154(b) by 197 days.

(21) Appl. No.: 13/677,425

(22) Filed: Nov. 15, 2012

(65) Prior Publication Data

US 2013/0139132 A1   May 30, 2013

(30) Foreign Application Priority Data

Nov. 29, 2011   (EP) .................................. 11191205.1

(51) Int. Cl.
   *G06F 9/45*   (2006.01)
(52) U.S. Cl.
   CPC ...................................... *G06F 8/447* (2013.01)

(58) Field of Classification Search
   CPC ............. G06F 8/41; G06F 8/443; G06F 8/54; G06F 9/44521; G06F 9/44508
   USPC .......................................................... 717/139
   See application file for complete search history.

(56) References Cited

U.S. PATENT DOCUMENTS

| | | |
|---|---|---|
| 5,956,513 A | 9/1999 | McLain, Jr. |
| 6,427,234 B1 | 7/2002 | Chambers et al. |
| 6,453,465 B1 | 9/2002 | Klein |
| 7,340,726 B1 * | 3/2008 | Chelf et al. .................... 717/126 |
| 2002/0199170 A1 * | 12/2002 | Jameson ........................ 717/120 |
| 2003/0163799 A1 * | 8/2003 | Vasilik et al. .................. 717/100 |

* cited by examiner

*Primary Examiner* — Ryan Coyer
*Assistant Examiner* — Hui-Wen Lin
(74) *Attorney, Agent, or Firm* — Grant A. Johnson

(57) ABSTRACT

An improved method for program building uses predefined source files and predefined build scripts comprising a sequence of build commands; wherein each build command comprises an origin command line interpretable by an operating system and addressed to at least one compiling tool.

12 Claims, 9 Drawing Sheets

```
<MOOverrides>
    <ModuleOverrideList>
     <ModuleOverride>
            <BuildMode>Archive</BuildMode>
            <OptionList>
                <OptionOverride>
                    <OptionAction>Replace</OptionAction>
                    <InOption>ld</InOption>
                    <OutOption>ar</OutOption>
                </OptionOverride>
            </OptionList>
        </ModuleOverride>
        <ModuleOverride>
            <Module>dw_gui.o</Module>
            <OptionList>
                <OptionOverride>
                    <OptionAction>Append</OptionAction>
                    <OutOption>-bbigtoc</OutOption>
                </OptionOverride>
            </OptionList>
        </ModuleOverride>
    </ModuleOverrideList>
</MOOverrides>
```

FIG. 7

```
<MOOverrides>
    <ModuleOverrideList>
     <ModuleOverride>
            <BuildMode>Link Program</BuildMode>
            <Module>disp+work</Module>
            <Predicate>%PRIVATE_PATH% == '1'</Predicate>
            <BeforeScript>
                export TMPDIR=%TMPDIR%/%pid%;
                mkdir -p %TMPDIR%;
                echo TMPDIR=%TMPDIR%;
            </BeforeScript>
            <AfterScript>
                rmdir %TMPDIR%/%pid%;
            </AfterScript>
        </ModuleOverride>
    </ModuleOverrideList>
</MOOverrides>
```

FIG. 8

```xml
<MOOverrides>
    <ModuleOverrideList>
      <ModuleOverride>
            <BuildMode>Compile</BuildMode>
            <Module>Test.obj</Module>
            <OptionList>
                  <OptionOverride>
                        <OptionAction>Replace</OptionAction>
                        <InOption>-o Test.obj</InOption>
                        <OutOption>-o OptTest.obj</OutOption>
                  </OptionOverride>
                  <OptionOverride>
                        <OptionAction>Append</OptionAction>
                        <InOption />
                        <OutOption>-O3</OutOption>
                  </OptionOverride>
            </OptionList>
      </ModuleOverride>
      <ModuleOverride>
            <BuildMode>Link</BuildMode>
            <Module>Test.exe</Module>
            <OptionList>
                  <OptionOverride>
                        <OptionAction>Replace</OptionAction>
                        <InOption>xlC*</InOption>
                        <OutOption>ld</OutOption>
                  </OptionOverride>
                  <OptionOverride>
                        <OptionAction>Replace</OptionAction>
                        <InOption>Test.obj</InOption>
                        <OutOption>OptTest.obj</OutOption>
                  </OptionOverride>
            </OptionList>
      </ModuleOverride>
    </ModuleOverrideList>
</MOOverrides>
```

FIG. 9

```
<MOOverrides>
    <ModuleOverrideList>
     <ModuleOverride>
            <SelectOption>sleep*</SelectOption>
            <OptionList>
                <OptionOverride>
                    <OptionAction>Append</OptionAction>
                    <OutOption>100</OutOption>
                </OptionOverride>
            </OptionList>
        </ModuleOverride>
        <ModuleOverride>
            <Iteration>0</Iteration>
            <OptionList>
                <OptionOverride>
                    <OptionAction>Delete</OptionAction>
                    <InOption>*</InOption>
                </OptionOverride>
                <OptionOverride>
                    <OptionAction>Append</OptionAction>
                    <OutOption>sleep;amp</OutOption>
                </OptionOverride>
            </OptionList>
        </ModuleOverride>
     </ModuleOverrideList>
</MOOverrides>
```

FIG. 10

METHOD AND SYSTEM FOR PROGRAM BUILDING

BACKGROUND OF THE INVENTION

1. Field of the Invention

The present invention relates in general to the field of program building for generating computer code interpretable by a target hardware platform, and in particular to a method for program building, and a system for program building using predefined source files and predefined build scripts. Still more particularly, the present invention relates to a data processing program and a computer program product for program building.

2. Description of the Related Art

Computer programs that run native on central processing units without runtime software interpretation are produced when human authored source code is translated into machine code by another program called a compiler. A compiler is typically a generic program that converts valid human readable source code to machine instructions. Commercial software foundries that produce large software programs typically use automated build processes to translate many thousands of source code files into machine code.

Performance of a software solution running on a particular hardware platform is dependent on multiple factors. One factor is the quality of code generated by the compiler that is used to build the software. A state of the art compiler can be instructed to generate highly optimized code; but this requires influencing the options that are passed to the compiler.

The SAP kernel, for example, is a composition of many thousands of c-modules compiled and bound together by instructions residing in over 170 make-files. These make-files are written by SAP and are, for the most part, platform agnostic.

The basic issue is: how to build an optimized kernel given the following conflicting factors, that the used compiler requires specific options to build optimized code, and the make-files—the instructions used to build the kernel—are platform agnostic; and therefore cannot be modified to suit a particular needs of a vendor.

In the Patent Publication U.S. Pat. No. 6,427,234 B1 "SYSTEM AND METHOD FOR PERFORMING SELECTIVE DYNAMIC COMPILATION USING RUNTIME INFORMATION" by Chambers et al. a system and method for performing selective dynamic compilation using runtime information is disclosed. The disclosed system implements a declarative; annotation based dynamic compilation and contains a sophisticated form of partial evaluation binding-time analysis (BTA), including program-point-specific poly-variant division and specialization, and dynamic versions of traditional global and peephole optimizations. The system provides policies that govern the aggressiveness of specialization and caching. It allows these policies to be declaratively specified, enabling programmers to gain fine control over the dynamic compilation process. It also enables programmers to specialize programs across arbitrary edges, both at procedure boundaries and within procedures, and to specialize programs based on evaluation of arbitrary compile-time and runtime conditions. To achieve a different compiled result source files are changed. Such a source code modification has to be avoided.

In the Patent Publication U.S. Pat. No. 6,453,465 B1 "METHOD AND SYSTEM FOR COMPILING SOURCE CODE CONTAINING NATURAL LANGUAGE INSTRUCTIONS" by Klein a system and method for compiling source code comprising natural language declarations, natural language method calls, and natural language control structures into computer-executable object code is disclosed. The system and method allow the compilation of source code containing both natural language and computer language into computer-executable object code. The system and method use a component database, containing components and associated natural language instructions, to select one or more components having an instruction declaration associated with the natural language instruction. A solution manager is used to resolve ambiguities inherent in the use of natural language instructions in the source code. Although a knowledge base is used in combination with specially written source code to influence the generation of machine code the disclosed system and method are pertained to specially written source files and do not pertain to the code generation process (build) itself.

In the Patent Publication U.S. Pat. No. 5,956,513 "SYSTEM AND METHOD FOR AUTOMATED SOFTWARE BUILD CONTROL" by McLain Jr. an automated computer program application, called an automated build control application, provides an improved tool for managing the software build process. The automated build control uses the specification of a programmer's original program files as input, and automatically identifies all header, include, and other shared library files, which eliminates coding of dependencies. The automated build control identifies embedded header files, such as those which are referenced in other header files. The automated build control identifies duplicate headers so future builds can be expedited. The automated build control ensures all necessary source modules are located and available for compilation, prior to compilation. The automated build control performs comparisons of date/time stamps and identifies what source modules require recompilation. Essentially, the automated build control evaluates the compiling and linking processes prior to performing them, thus detecting any potential errors or conflicts before any time and effort is wasted. The disclosed tool for building software is similar to what most modern development tools like Microsoft visual Studio or Eclipse do when generating software by examining source files and determining dependencies. Nevertheless the disclosed system and method make no reference to a knowledgeable or of affecting an existing program build process without intervention.

SUMMARY OF THE INVENTION

The technical problem underlying the present invention is to provide a method for program building and a system for program building, which are producing optimized code to suit particular needs of a vendor and to solve the above mentioned shortcomings and pain points of automated program build processes according to prior art.

According to the present invention this problem is solved by providing a method for program building having the features of claim 1, a system for program building having the features of claim 7, a data processing program for program building having the features of claim 14, and a computer program product for program building having the features of claim 15. Advantageous embodiments of the present invention are mentioned in the subclaims.

Accordingly, in an embodiment of the present invention a method for program building uses predefined source files and predefined build scripts comprising a sequence of build commands; wherein each build command comprises an origin command line interpretable by an operating system and addressed to at least one compiling tool; wherein each command line comprises a source file name and/or a destination file name and/or a program name and/or an indication of at least one action to be performed by the at least one addressed compiling tool and/or an option related to a corresponding action to be performed; wherein each origin command line is parsed to identify components of the corresponding build command; wherein each identified component is evaluated against rule sets containing conditions and instructions to change the origin command line, wherein matching rule sets are processed to generate at least one resultant command line interpretable by the operating system, wherein processing of the at least one resultant command line by the operating system produces an intermediate output file recursively processed by at least one additional command line and/or a final output file interpretable by a target hardware platform.

In further embodiments of the present invention, matching rule sets are processed to run a script triggered by at least one component of the origin command line, wherein running of the script generates at least one resultant command line.

In further embodiments of the present invention, the script is a pre-compile script and/or a post-compile script.

In further embodiments of the present invention, to generate the at least one resultant command line components of a corresponding origin command line are replaced, deleted or appended.

In further embodiments of the present invention, the rule sets comprise predicate conditions and command line component modification instructions and runtime script declarations, wherein a Cartesian product is formed based on the input dimensions and the rule sets stored in a knowledge database, wherein for each command line component satisfying the predicate conditions of a rule set corresponding command line component modifications are applied and corresponding scripts are invoked at defined points in program flow.

In further embodiments of the present invention, the rule sets comprise predicate conditions and command line component modification instructions and runtime script declarations, wherein a Cartesian product is formed based on said input dimensions and said rule sets stored in a knowledge database, wherein for each command line component satisfying said predicate conditions of a rule set corresponding command line component modifications are applied and corresponding scripts are invoked at defined points in program flow.

In another embodiment of the present invention, a system for program building comprises a resource pool with predefined source files and predefined build scripts comprising a sequence of build commands; a unified build frontend and at least one compiling tool, wherein each build command comprises an origin command line interpretable by an operating system and addressed to at least one compiling tool; wherein the unified build frontend performs the steps of: Receiving the predefined source files and the sequence of build commands from the operating system, wherein each command line comprises a source file name and/or a destination file name and/or a program name and/or an indication of at least one action to be performed by the at least one addressed compiling tool, and an option related to a corresponding action to be performed; loading a control file stored in a knowledge database containing rule sets with conditions and instructions in order to modify the origin command line; parsing each origin command line to identify components of the corresponding build command; wherein each identified component is evaluated against the rule sets, processing matching rule sets to generate at least one resultant command line interpretable by the operating system, and outputting the resultant command line to the operating system, wherein the operating systems processes the at least one resultant command line and produces an intermediate output file recursively processed by at least one additional command line and/or a final output file interpretable by a target hardware platform.

In further embodiments of the present invention, the unified build frontend processes the matching rule sets to initiate a script run on the operating system triggered by at least one component of the origin command line, wherein running of the script generates at least one resultant command line.

In further embodiments of the present invention, the script is a pre-compile script and/or a post-compile script.

In further embodiments of the present invention, the unified build frontend generates the at least one resultant command line by performing at least one of the following actions: Replacing, deleting and appending components of a corresponding origin command line.

In further embodiments of the present invention, the at least one compiling tool is a program invoked by the operating system during processing of the at least one resultant command line preferably a high level language compiler or a program linker.

In further embodiments of the present invention, the rule sets comprise predicate conditions and command line component modification instructions and runtime script declarations, wherein the unified build frontend forms a Cartesian product based on the input dimensions and the rule sets stored in the knowledge database.

In further embodiments of the present invention, the unified build frontend applies corresponding command line component modifications for each command line component satisfying the predicate conditions of a rule set and invokes corresponding scripts at defined points in program flow.

In another embodiment of the present invention, a data processing program for execution in a data processing system comprises software code portions for performing a method for program building when the program is run on the data processing system.

In yet another embodiment of the present invention, a computer program product stored on a computer-usable medium, comprises computer-readable program means for causing a computer to perform a method for program building when the program is run on the computer.

The major aspect of the introduced invention is a smart means to modify the behavior of an automated program build process. The modification may include but is not limited to replacing; deleting or appending components of an origin command line of a corresponding build command, changing order or type of used compiling tools, or running a pre-compile script or a post compile script triggered by at least one component of the origin command line. Whereby smart, is here defined as making decisions by evaluating input parameters and environmental conditions in correlation to rules stored within a knowledge database.

All in all, embodiments of the present invention are able to changing the SAP program build results without changing SAP build scripts and introduce a compiler, linker, and tool replacement wrapper that change the characteristics of the program build environment without modifying the existing build scripts or input files. Additionally generic 'rules' stored in a knowledge base describe how the program build environment changes dynamically. The rule selection is based on the program build environment, the target hardware platform, and components of the origin command line of a corresponding build command like source and destination file names, program name, and an indication of at least one action to be performed, and arbitrary predicates of the rule set. The change could be replacing, deleting or appending components of an origin command line create and/or pre-processing or post-processing of scripts to generate the resultant command line processed by the operating system to produce an intermediate output file recursively processed by at least one additional command line, or a final output file interpretable by the target hardware platform.

Advantageously, embodiments of the present invention offer smart command line component mutation, process control, and script injection also for compiler invocation. The essence of the invention is the intelligent selection of command line component mutation instructions and selection of scripts.

One instance of the invention comprises of a unified build frontend, or front end replacement, that selectively mutates command line components and conditionally executes pre- and post-processing scripts before and after program building. The most significant portion of the invention is the smart condition determination and evaluation based on program building environment, target hardware platform and command line components. The primary benefit of the invention is a means to selectively modify command line components and to execute processing scripts in the program build process before source code to machine code compiling occurs, without having to modify invoking scripts or build process control files known as make files in the industry.

When redirecting generic program invocation through the invention, the invention provides a smart mechanism to mutate program invoking commands and additionally provides a mechanism to run scripts before and after underlying program invocation. By using the invention as a front-end invocation replacement for compiler and linker commands, a build process for generating software can be dramatically influenced without having to actually modify build scripts, e.g. make files, used to control the process. One such use of this facility is the generation of highly optimized profiled software wherein the generation of such would require special command options and tools and wherein the original build scripts were not written with this sort of optimization in mind. Another use of such a facility is the replacement of one compiler vendor for another wherein the build scripts contain vendor specific options. Another use of such a facility is the ability to selectively reduce optimization of particular modules when one vendor's compiler generates code that violates the original intentions of the source code.

The prior art method of determining input parameters to a compiler is by way of pre-selected parameters or by way of explicit conditional logic within invoking scripts or build process control files (make files). The practice of inserting an intermediate front-end tool to invoke an underlying tool is common; but a smart command line component mutation based on a knowledge base is not.

The prior art method of running scripts before compilation involves running the compiler from within a script or make-file. Within a script or make-file, commands can be issued before and after invoking the compiler. The invention here reverses this process; instead of the script running the compiler, the unified build frontend can run a script from within its own process. The infrastructure to intelligently select when, how and under what conditions to process script commands by the unified build frontend makes this feasible.

Embodiments of the present invention intercept each call to the compiling tools during the kernel build process and modify the command line components that are passed to the compiling tools, if needed. The unified build frontend is a direct invocation replacement for the compiler and allows the operating system to call the unified build frontend without the need to change anything other than a platform specific initial configuration file. The unified build frontend is smart and understands the intent of each program build step and—by way of a knowledge base—can be instructed to generate code that is very different than code that would have been generated by a standard build process.

Embodiments of the present invention allow dynamic modification of program build commands within a long sequence of build commands similar to those of originating from program make scripts. The original program make scripts are not modified and the instructions directing the dynamic modification of the program build commands are stored in a knowledge data base.

Further embodiments of the present invention provide the ability to use special tools to compile specific parts of the used kernel to improve performance or integrity. Another example is the ability to instruct the compiler to generate alternative code; when it is determined that either; a module doesn't lend itself to be optimized in a particular fashion, or a compiler abnormality (bug) causes the compiler to generate invalid code.

The above, as well as additional purposes, features, and advantages of the present invention will become apparent in the following detailed written description.

BRIEF DESCRIPTION OF THE DRAWINGS

A preferred embodiment of the present invention, as described in detail below, is shown in the drawings, in which

FIG. 7 is a schematic control flow of a parameter mutation control file, in accordance with an embodiment of the present invention;

FIG. 8 is a schematic control flow of a compiler script control file, in accordance with an embodiment of the present invention;

FIG. 9 is a schematic control flow of a simple compile and link control file, in accordance with an embodiment of the present invention; and FIG. 10 is a schematic control flow of an iteration control file, in accordance with an embodiment of the present invention.

DETAILED DESCRIPTION OF THE PREFERRED EMBODIMENTS

Figure 1:
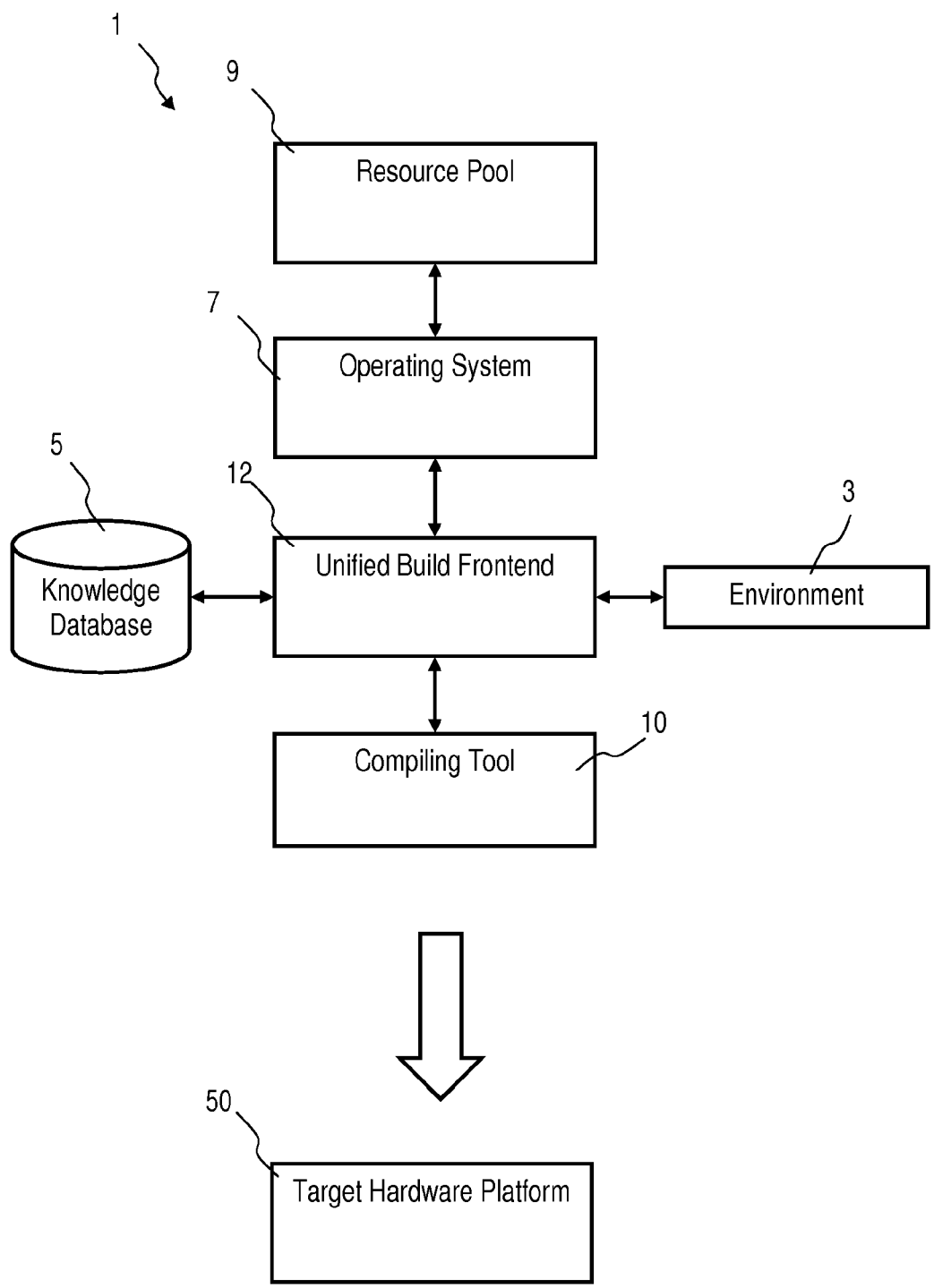
FIG. 1 is a schematic block diagram of a system for program building, in accordance with an embodiment of the present invention.
Figure 2:
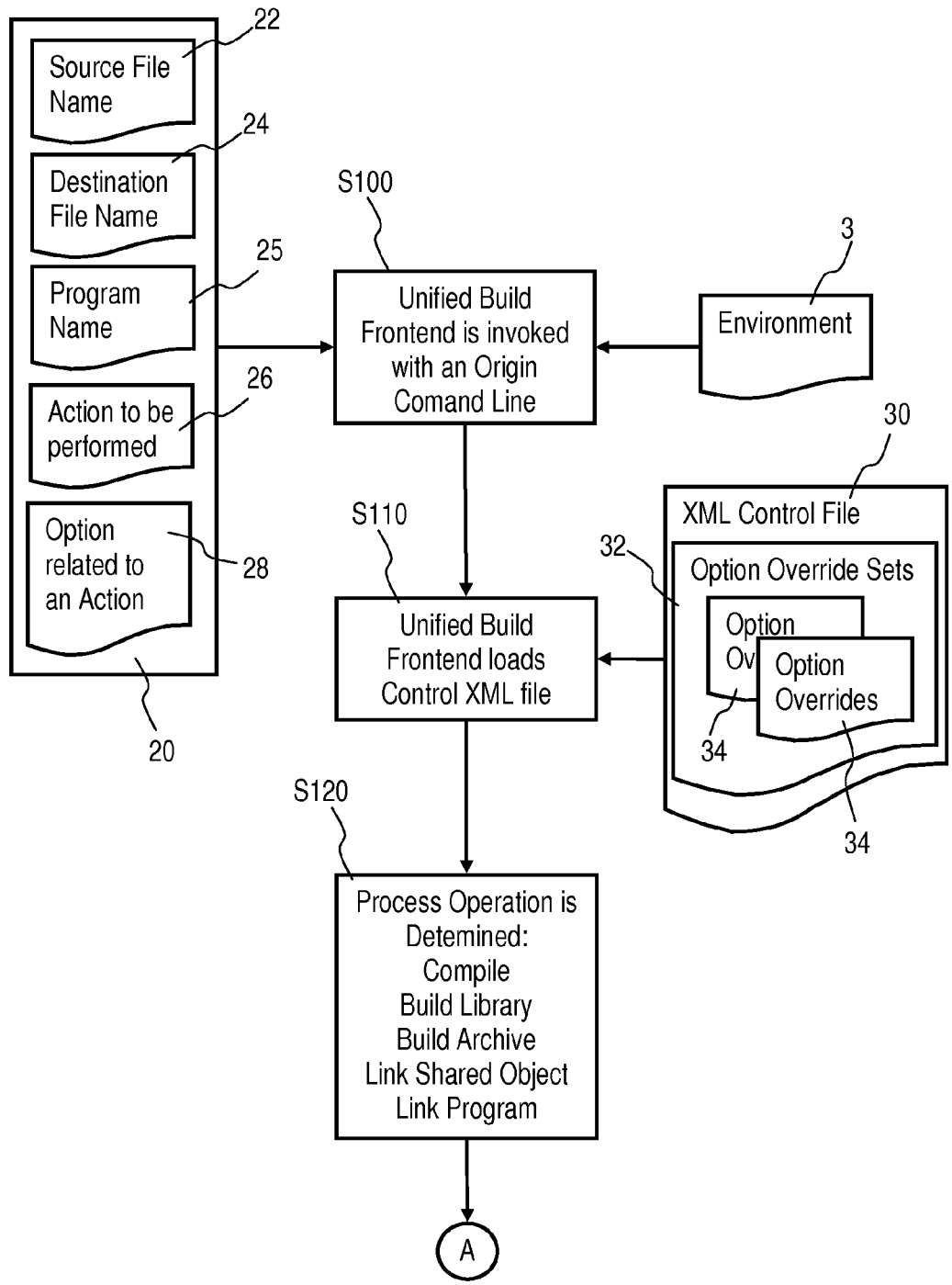
FIG. 2 to 4 is a schematic flow diagram of a method for program building, in accordance with a first embodiment of the present invention.
Figure 3:
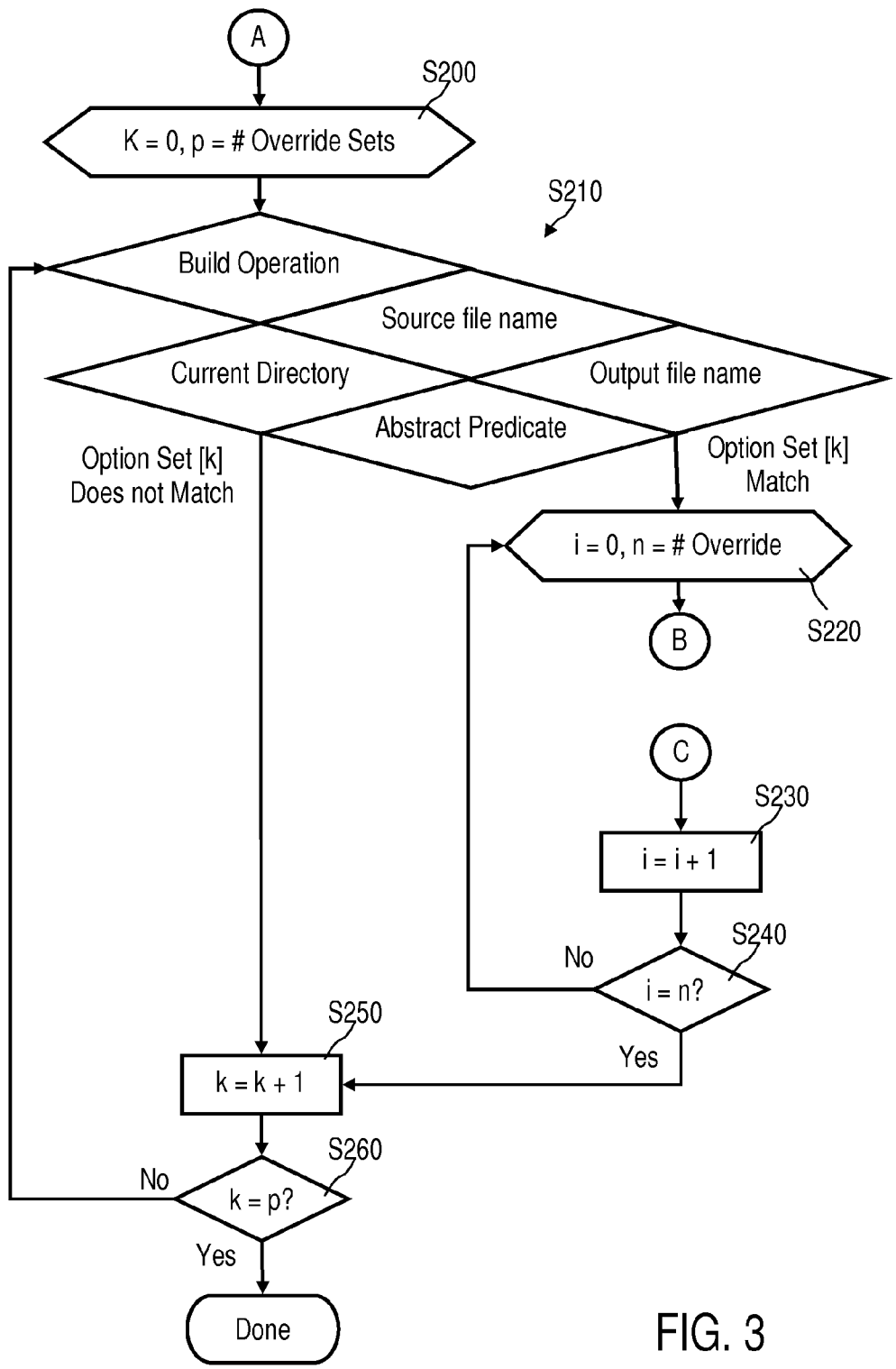
Figure 4:
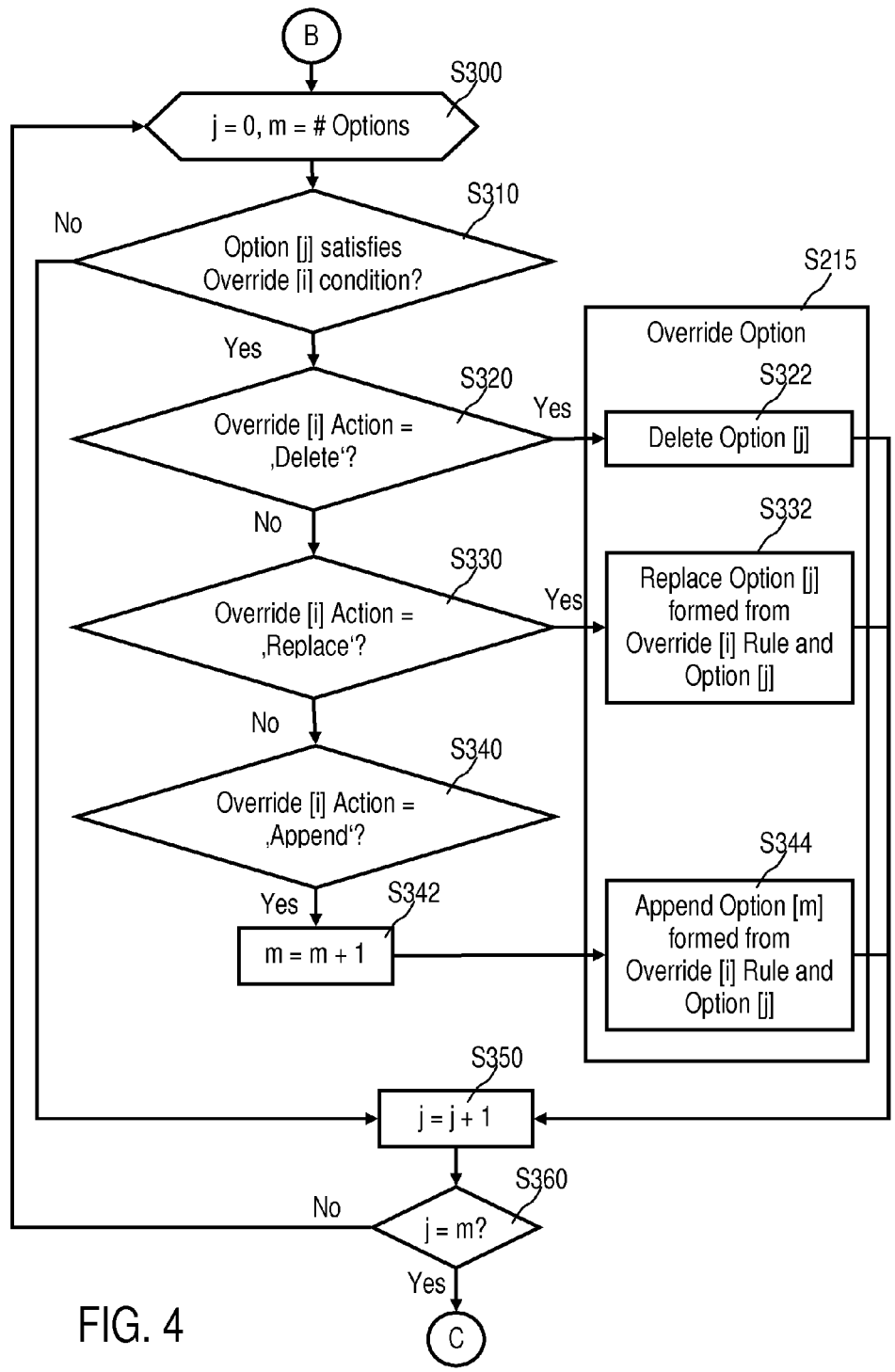

FIG. 1 shows a system for program building, in accordance with an embodiment of the present invention, and FIG. 2 to 4 show a method for program building, in accordance with a first embodiment of the present invention.

Referring to FIGS. 1 and 2, the shown embodiment of the present invention employs a system 1 for program building comprising a resource pool 9 with predefined source files and predefined build scripts comprising a sequence of build commands; a unified build frontend 12 and at least one compiling tool 10. Each build command comprises an origin command line 20 interpretable by an operating system 7 and addressed to at least one compiling tool 10. In the shown embodiments the origin command line 20 contains a source file name 22, a destination file name 24, a program name 25, an indication of at least one action 26 to be performed by the at least one addressed compiling tool 10, and an option 28 related to a corresponding action 26 to be performed.

According to the present invention the unified build frontend performs 12 the steps of: Receiving the predefined source files and the sequence of build commands from the operating system 7; loading a control file 30 stored in a knowledge database 5 containing rule sets 32 with conditions 38 and instructions in order to modify said origin command line 20; parsing each origin command line 20 to identify components 22, 24, 25, 26, 28 of the corresponding build command; wherein each identified component 22, 24, 25, 26, 28 is evaluated against the rule sets 32, processing matching rule sets to generate at least one resultant command line interpretable by the operating system 7, and outputting the resultant command line to the operating system 7, wherein the operating system 7 processes the at least one resultant command line and produces at least an intermediate output file recursively processed by at least one additional command line, or a final output file interpretable by a target hardware platform 50.

The unified build frontend 12 provides additional or alternative processing before and/or after a compiling process by injecting at least one script 40. Therefore the unified build frontend 12 processes the matching rule sets to initiate a script 40 run on the operating system 7 triggered by at least one component 22, 24, 25, 26, 28 of the origin command line 20, wherein running of the script 40 generates at least one resultant command line. The script 40 is a pre-compile script, or a post-compile script, for example.

In the following, embodiments of the present invention are explained with respect to the unified build frontend 12 employed as compiler frontend. Therefore calls to the compiling tool 10 are substituted by calls to the unified build frontend 12 referred to unified_cc_ld in some of the following examples. The replacement can be accomplished either manually, by way of aliases, or by directing calls to the unified build frontend 12 (unified_cc_ld) through path or file system link (file system re-direction).

Referring to FIGS. 1 and 2, a call to the compiling tool 10 contains the origin command line 20, in the following also called input parameters, including name 22 of the source file or files, name 24 of the destination file where the generated output should be stored, indications of actions 26 telling the compiling tool 10 what work is to be done, compile, link, etc., and options 28 related to the action 26 to be performed that would change compiling tool processing; some having effect on the generated output.

The essence of the invention is the intelligent selection of command line component or input parameter mutation instructions and selection of scripts 40. In the shown embodiment of the present invention, the command line component 22, 24, 25, 26, 28 or input parameter mutation instructions and script selection is based on a number of dimensions like build operation, source file name(s) 22, destination file name(s) 24, program name 25, action(s) 26 to be performed, option(s) related to the action(s) 26 to be performed, abstract predicate condition(s) 38 and file system directory path, e.g. current working directory, source file path, etc.

The above dimensions are deciphered from the origin command line 20 or input parameters and the current program build environment 3. The invention also comprises the knowledge database 5 containing the rule sets 32. A rule set 32 consists of both the predicate conditions 38, i.e. when the rule should be applied, and the command line component or input parameter mutation instructions 34 also containing selection and application rule and runtime script declarations. The XML syntax, for example, is well suited to compose the knowledge database 5. A Cartesian product of the input dimensions with the rule sets 32 of the knowledge database 5 is formed. For each command line component 22, 24, 25, 26, 28 satisfying the rule's predicate conditions 38; the rule's command line component or input parameter mutation instructions 34 are applied to the command line components 22, 24, 25, 26, 28 or input parameters, and the scripts 40 are invoked at the defined points in the program flow.

Referring to FIG. 2 to 4, the corresponding flowchart depicts a typical first embodiment of the method for program building performing command line component or input parameter mutation. The three main steps are starting the unified build frontend 12 in precisely the same fashion as would be the underlying compiling tool 10, detecting environmental parameters and read XML control file 30, and iterating the input command line components 22, 24, 25, 26, 28 or input parameters and mutating them.

Still referring to FIG. 2 to 4, during program generation, the compiling tool 10 is usually started by way of the origin command line 20 provided by the operating system 7 or by an automated make program. In either case, the unified build frontend 12 receives information by the origin command line 20, like name of the source file or files 22; name of the destination file 24; program name 25, indications that determine the action 26 the compiling tool 10 should perform, for example compile, compile and link, link, etc.; and options 28 related to the action 26 to be performed. The unified build frontend 12 also receives information by way of the process environment 3.

The unified build frontend 12 reads a control file 30, in step S110. In the shown instance of the invention, the control file 30 is written in XML format. The control file 30 contains two basic components like the predicates, i.e. a specification of condition when a parameter mutation should be applied, and a list of option overrides 34, i.e. descriptions of how command line components 22, 24, 25, 26, 28 or input parameters are to be mutated, e.g. added, replaced, or deleted. FIG. 7 shows a corresponding command line component or input parameter mutation control file 30, in accordance with an embodiment of the present invention.

Some compiling tools 10 are capable of more than code generation. Compiling tools 10 may preprocess a macro language; generate machine instructions, link modules containing machine instructions together as a large module, e.g. library or archive, shared module, or program. In step S120, the type of operation may be determined by information of the environment 3, the origin command line 20, or content of source files specified in the origin command line 20, e.g. source code, machine code, archive file, etc.

Referring to FIG. 3, an XML Control file 30 may contain a number of independent sections each containing a set of predicates and a set 32 of option overrides 34, i.e. command line component or input parameter mutation descriptions. The unified build frontend 12 iterates over the override sets 32 in subroutine S200. This corresponds to ModuleOverride in the corresponding parameter mutation control file shown in FIG. 7. In step S210, for each override set 32, the command line components 22, 24, 25, 26, 28 or input parameters and environment information are compared with the control scrip conditions (predicates) of the XML control file 30 to determine whether the override set 32 should be applied. If the override set conditions don't match, the next set index (k) is incremented in step S250. If the set index matches the number of override sets 32 in step S260, the command line component or input parameter mutation is complete; otherwise the next override set 32 is processed in step S210.

An override set 32 may contain a number of independent option overrides 34, i.e. command line component or input parameter mutation descriptions. In subroutine S220, the unified build frontend 12 iterates over the option overrides 34. This corresponds to OptionList in the corresponding parameter mutation control file shown in FIG. 7. For each option override 34, the unified build frontend 12 is called with a set of input options represented by abstract predicate condition 38, command line components 22, 24, information about the current directory and the build operation. In subroutine S300, shown in FIG. 4, the unified build frontend 12 iterates over the input options. In the typical instance, all control files 30 or command line components 22, 24, 25, 26, 28 or input parameters, information about the environment and the build operation to the unified build frontend 12 are considered options. A first option is the underlying command to be invoked. For each input option, the override condition is compared with the input option in step S310, to determine if the override should be applied. In one instance of the present invention, the comparison may be way of regular expression evaluation.

If the override condition doesn't match, the next option index (j) is incremented in step S350. If the option index matches the number of options, in step S360, the option iteration is complete; otherwise the next option is processed in subroutine S300.

In subroutine S215, an option override may consist of one of three actions: Delete option, in step S322, replace option, in step S332, or append option in step S344. If the action recognized in step S320 is 'Delete', the option is simply removed from the options that will be passed to the underlying compiling tool 10, in step S322. If the action recognized in step S330 is 'Replace', the option is replaced by a value formed by the override's rule in step S332. In one instance of the present invention, the override rule may be an expression statement containing literals and variables. The variables may be text segments of the original option. If the action recognized in step S340 is 'Append', the number of options is increased by one in step S342, and in step S344 an option is added by a value formed by the override's rule in a fashion similar to step S332.

The next option index (j) is incremented, in step S350. If the option index matches the number of options, in step S360, the option iteration is complete; otherwise the next option is processed in subroutine S300.

If the option iteration is complete, the next override index (i) is incremented in step S230, shown in FIG. 3. If the override index matches the number of overrides, in step S240, the override iteration is complete; otherwise the next override is processed in subroutine S220.

If the override iteration is complete, the next set index (k) is incremented in step S250. If the set index matches the number of override sets, in step S260, the command line component or input parameter mutation is complete; otherwise the next override set is processed in step S210.

In one instance of the invention, the knowledge database 5 used to describe how and under what conditions command line components 22, 24, 25, 26, 28 or input parameters are mutated, is described within an XML formatted control file 30. XML is extended Markup Language, and due to its adeptness for describing items, sets and groups, is well suited for describing the contents of a knowledge database 5 for an instance of the invention.

In reference to FIG. 7, the tags have the following meanings: <ModuleOverrideList>: One clause per file. This tag marks the beginning of the list of override sets 32. <ModuleOverride>: Many clauses per file. This tag marks the beginning of a single override set 32, containing a number of predicates and associated set of overrides 32. <BuildMode>: An instance of a selection predicate. This particular predicate defines to which step of the program generation process this override set applies. <OptionList>: One clause per override set 32. This tag marks the beginning of a set of overrides 32. <OptionOverride>: Many clauses per override set. This tag marks the beginning of a single option override 34 (parameter mutation rule). <OptionAction>: One per option overrides 34. This tag defines an action, i.e. how the program input parameters 20 should be mutated, for example replaced, appended, or deleted. <InOption>: One per option overrides 34. Specifies a comparison predicate, i.e. when the predicate evaluates to true, the mutation defined by tag <OptionAction> and tag <OutOption> is applied. <OutOption>: One per option overrides 34. Evaluates to a resultant (mutated) parameter for tag <OptionActions> replace or append.

A set of specification rules for an instance of the invention used in program generation may comprise "Compile", "Library", "Archive", "Shared" and/or "Program" as BuildMode; "Replace", "Delete" and/or "Append" as OptionAction, for example.

Figure 5:
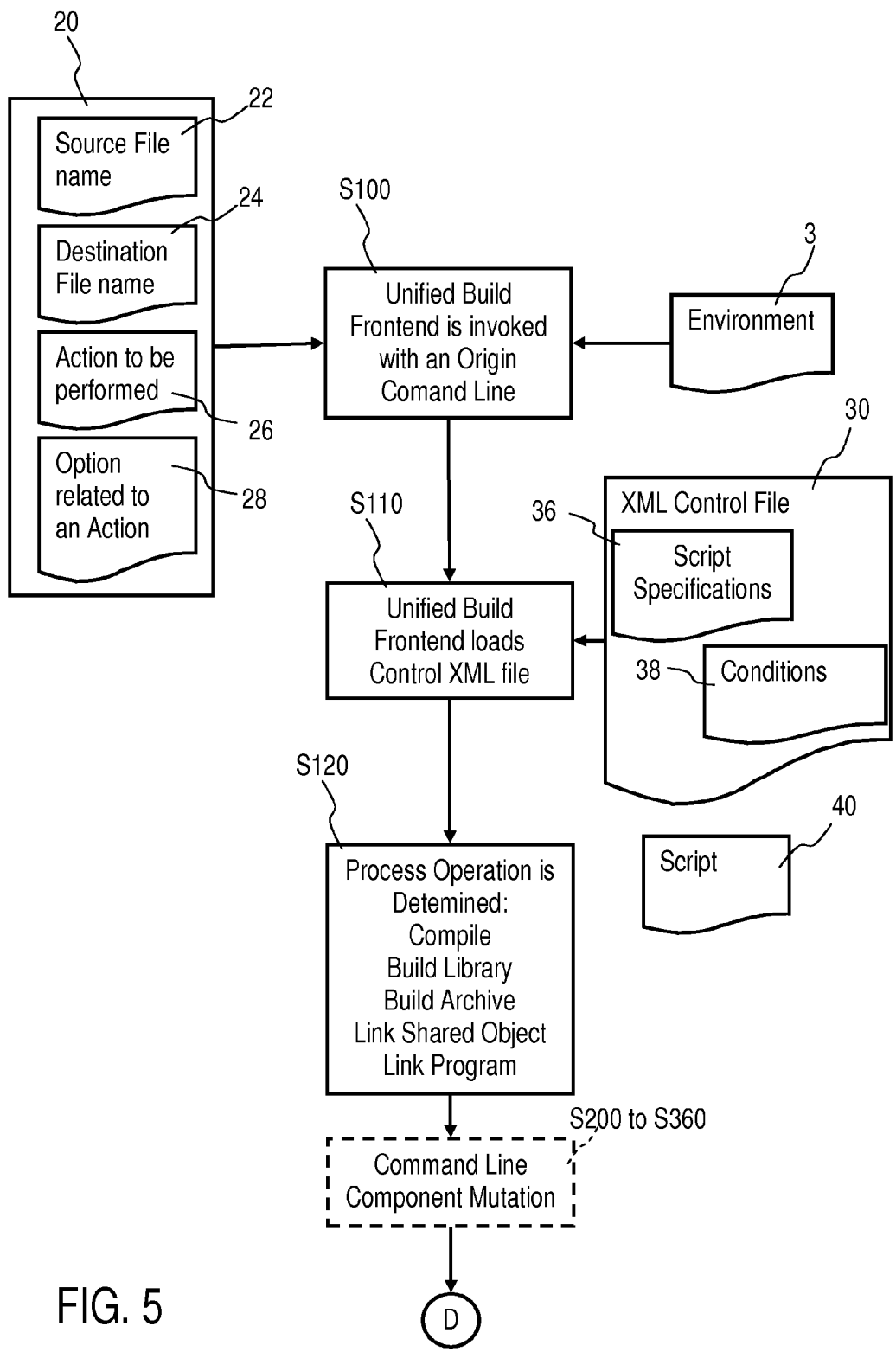
FIGS. 5 and 6 is a schematic flow diagram of a method for program building, in accordance with a second embodiment of the present invention.
Figure 6:
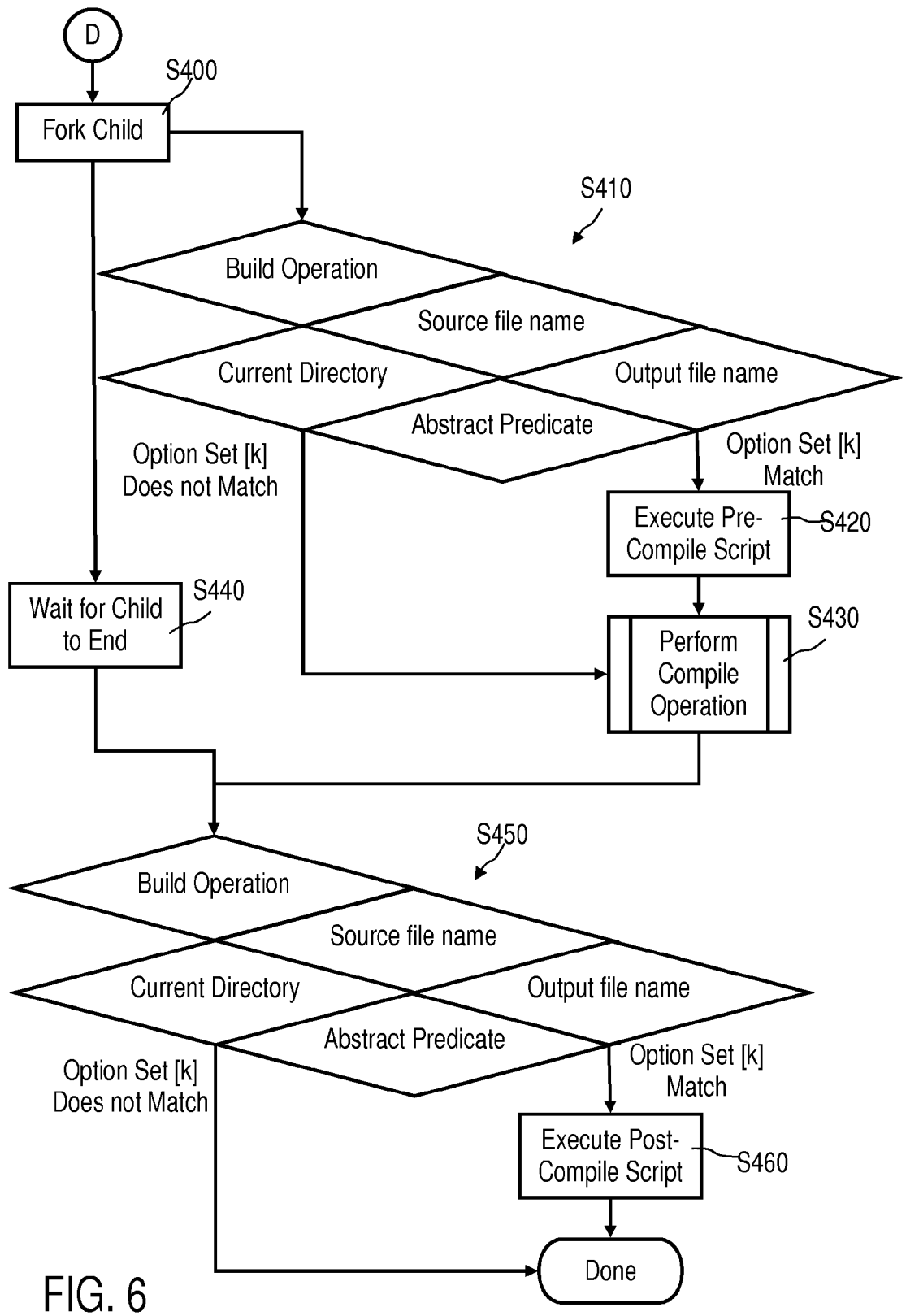

FIGS. 5 and 6 show a method for program building, in accordance with a second embodiment of the present invention.

Referring to FIGS. 5 and 6, the corresponding flowchart depicts a typical instance of the invention for compiler script injection. The five main steps are, starting the unified build frontend 12 in precisely the same fashion as would be the underlying compiling tool 10; detecting environmental parameters and reading XML control file 30, iterating the input command line components 22, 24, 25, 26, 28 or input parameters and mutating them, initiating a new process within which a pre-compile script may be run and/or the underlying compiling tool 10 is invoked and/or a post-compile script may be run.

Referring to FIG. 5, during program generation, the compiling tool 10 is usually started by way of the origin command line 20 provided by the operating system 7 or by an automated make program, in step S100. In either case, the unified build frontend 12 receives information by the origin command line 20, like name of the source file or files 22; name of the destination file 24; program name 25, indications that determine the action 26 the compiling tool 10 should perform. The unified build frontend 12 also receives information by way of the process environment 3.

In step S110, the unified build frontend 12 reads a control file 30. In the shown embodiment of the present invention, the control file 30 is written in XML format. The control file 30 contains two basic components, the predicates, i.e. a specification of condition 38 when a script 40 should run; and a script specification 36, i.e. a pointer to the script 40 or the script 40 itself.

Some compiling tools 10 are capable of more than code generation. Compiling tools 10 may preprocess a macro language; generate machine instructions, link modules containing machine instructions together as a large module, e.g. library or archive, shared module, or program. In step S120, the type of operation may be determined by environment 3, command line components 22, 24, 25, 26, 28 or input parameters, or content of source files specified in the command line components 22, 24, 25, 26, 28 or input parameters, e.g. source code, machine code, archive file, etc.

Referring to FIG. 6, in step S400, the unified build frontend 12 builds a duplicate process of itself (fork), i.e. a first child process. In step S440, the parent process waits for the first child process to finish. Within the first child process in step S410, the command line components 22, 24, 25, 26, 28 or input parameters and the environment information are compared with the control script conditions 38 (predicates) to determine whether a pre-compile script should be run. If conditions are met the corresponding pre-compile script is executed in Step S420. The shown embodiment of the present invention may process commands in the pre-compile script by performing actions within the first child process. Alternative embodiments of the present invention, not shown, may process commands by spawning the command in a secondary child process of the first child process. Embodiments of the present invention may offer the feature to set environment variables within the child process. Another feature may be the evaluation of environment variables. Still another feature may be the evaluation of the child's process identifier (PID). In step S430, the next stage compile operation is performed within the first child process, e.g. via an exec( )function, or in a secondary child process of the first child process. In step S430, the compile operation may be compile, compile and link, link, etc. Once the first child process has completed the command line components 22, 24, 25, 26, 28 or input parameters and the environment information are compared with the control script conditions in step S450, to determine whether a post-compile script should be run in step S460. If conditions are met the post-compile script is executed in step S460, in the same fashion as the pre-compile script in step S420. If the conditions are not met or if the post-compile script is executed in step S460, the unified build frontend 12 has finished and returns control to the caller.

In an operating system, where new processes are spawned rather than forked (e.g. Microsoft Windows), the spawned child would receive enough information to be able to complete steps S410 to S430, as though the child was a result of a fork operation. The child process is necessary because the script 40 that may be run in step S420 must run in a different process than the parent, because after the compile operation in step S430 is finished, the parent must regain control to execute a post-compile script, in step S460.

FIG. 8 shows a compiler script control file, in accordance with an embodiment of the present invention. The shown compiler script control file demonstrates how scripts 40 could be stored within a XML control file 30 of the knowledge database 5. See command line component or input parameter mutation control file description above for a description of the used tags in the compiler script control file. A script 40 is a list of operating system (OS) commands separated by ';' to be run before or after the compiling tool 10.

FIG. 9 shows a simple compile and link control file, in accordance with an embodiment of the present invention.

Referring to FIG. 9, the shown example demonstrates a simple compile and link step of a single source code program. FIG. 9 shows the XML control file 30 for the example. The XML control file specifies two separate option override groups, i.e. <ModuleOverride>. One group mutates the compilation step of the program; the other group mutates the link step. During the compilation step, two mutations occur. The name of the output object is changed from Test.obj to Opt-Test.obj and an -O3 option is added, indicating to the hypothetical compiling tool 10 to generate highly optimized code. During the Link step, that is, creating an executable, two mutations occur. The name of the input object is changed from Test.obj to OptTest.obj and the underlying linker tool is exchanged from xlC to ld.

In embodiments of the present invention, the name of the unified build frontend 12 itself is considered an input parameter. If the unified build frontend tool 12 is named unified_cc_ld_underlying_tool_name then the unified build frontend tool 12 deciphers the underlying tool to be 'underlying_tool_name' and considers this as the first input argument. This provides an additional means for the unified build frontend tool 12 too, to determine what task it is intended to perform. For example, a unified_cc_ld_CC is a c++ code compiler and unified_cc_ld_ld is a linker. Before running scripts to perform a software build the compile command CC is aliased to unified_cc_ld_CC and the linker command ld is aliased to unified_cc_ld_ld.

In a typical instance of the invention, both command line component or input parameter mutation and compiler script injection are performed by the same unified build frontend 12. Due to the complementary XML tag names, one XML control file 30 can contain both command line component or input parameter mutation instructions and before and after script declarations. When processing command line component or input parameter mutation and script injections, the command line component or input parameter mutation would typically be performed prior to spawning a new process in which the before script and the underlying compiling tool 10 would be invoked, shown as dashed box S200 to S360 in FIG. 5.

FIG. 10 is a schematic control flow of an iteration control file, in accordance with an embodiment of the present invention.

In some situations, it could be desired that a particular module or program be built with different options, an optimized and a debug-able version of a program. One means for this is an iteration process control feature. The XML control file 30 contains a provision to specify the number of times a particular compile step should be performed. The XML control file 30 also has a provision to specify that certain sections of the control file are only valid for a particular iteration. Appending a hash '#' and an integer (n) to the first option or program to be invoked, causes the program to be issued n times. Appending an ampersand '&' to the first option or program to be invoked causes the program to be issued in the background in parallel.

The example shown in FIG. 10 mutates any invocation into five sleep calls running in parallel.

Embodiment of the present inventive can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for program building using predefined source files and predefined build scripts comprising a sequence of build commands;
   wherein each build command comprises an origin command line (20) interpretable by an operating system (7) and addressed to at least one compiling tool (10);
   wherein each command line (20) comprises at least one of the following:
   a source file name (22), a destination file name (24), a program name (25), an indication of at least one action (26) to be performed by said at least one addressed compiling tool (10), and an option (28) related to a corresponding action (26) to be performed;
   wherein each origin command line (20) is parsed to identify components (22, 24, 25, 26, 28) of said corresponding build command;
   wherein each identified component (22, 24, 25, 26, 28) is evaluated against rule sets (32) containing conditions and instructions to change said origin command line (20),
   wherein matching rule sets are processed to generate at least one resultant command line interpretable by said operating system (7),
   wherein processing of said at least one resultant command line by said operating system (7) produces at least one of the following:
   an intermediate output file recursively processed by at least one additional command line, and a final output file interpretable by a target hardware platform (50), and wherein said rule sets (32) comprise predicate conditions (38) and command line component modification instructions (34) and runtime script declarations (36), wherein a Cartesian product is formed based on said input dimensions and said rule sets (32) stored in a knowledge database (5), wherein for each command line component (22, 24, 25, 26, 28) satisfying said predicate conditions (38) of a rule set (32), corresponding command line component modifications (34) are applied and corresponding scripts (40) are invoked at defined points in program flow.

2. The Method according to claim 1, wherein said matching rule sets are processed to run a script (40) triggered by at least one component (22, 24, 25, 26, 28) of said origin command line (20), wherein running of said script (40) generates at least one resultant command line.

3. The Method according to claim 2, wherein said script (40) is at least one of the following:
   A pre-compile script and a post-compile script.

4. The Method according to claim 1, wherein to generate said at least one resultant command line components (22, 24, 25, 26, 28) of a corresponding origin command line (20) are replaced, deleted or appended.

5. The Method according to claim 1, wherein said rule sets (32) are written in XML syntax.

6. A data processing program for execution in a data processing system comprising: a processor, and a memory in communications with said processor, wherein the memory contains software code portions for performing a method for program building according to claim 1 when said program is run on said processor.

7. A computer program product stored on a non-transitory computer-usable medium, comprising non-transitory computer-readable program means for causing a computer to perform a method for program building according to claim 1 when said program is run on said computer.

8. A system for program building comprising:
   a memory; and
   a processor, wherein the processor in combination with the memory is configured to provide:
   A resource pool (9) with predefined source files and predefined build scripts comprising a sequence of build commands; a unified build frontend (12) and at least one compiling tool (10),
   wherein each build command comprises an origin command line (20) interpretable by an operating system (7) and addressed to at least one compiling tool (10);
   wherein said unified build frontend performs (12) the steps of:
   Receiving said predefined source files and said sequence of build commands from said operating system (7),
   wherein each command line (20) comprises at least one of the following:
   A source file name (22), a destination file name (24), a program name (25), an indication of at least one action (26) to be performed by said at least one addressed compiling tool (10), and an option (28) related to a corresponding action (26) to be performed;
   loading a control file (30) stored in a knowledge database (5) containing rule sets (32) with conditions (38) and instructions in order to modify said origin command line (20);
   parsing each origin command line (20) to identify components (22, 24, 25, 26, 28) of said corresponding build command; wherein each identified component (22, 24, 25, 26, 28) is evaluated against said rule sets (32),
   processing matching rule sets to generate at least one resultant command line interpretable by said operating system (7), and
   outputting said resultant command line to said operating system (7),
   wherein said operating system (7) processes said at least one resultant command line and produces at least one of the following:
   An intermediate output file recursively processed by at least one additional command line, and a final output file interpretable by a target hardware platform (50), wherein said rule sets (32) comprise predicate conditions (38) and command line component modification instructions (34) and runtime script declarations (36), wherein said unified build frontend (12) forms a Cartesian product based on said input dimensions and said rule sets (32) stored in said knowledge database (5), and
   wherein said unified build frontend (12) applies corresponding command line component modifications (34) for each command line component (22, 24, 25, 26, 28) satisfying said predicate conditions (38) of a rule set (32) and invokes corresponding scripts (40) at defined points in program flow.

9. The system according to claim 8, wherein said unified build frontend (12) processes said matching rule sets to initiate a script (40) run on said operating system (7) triggered by at least one component (22, 24, 25, 26, 28) of said origin command line (20), wherein running of said script (40) generates at least one resultant command line.

10. The system according to claim 9, wherein said script (40) is at least one of the following:

A pre-compile script and a post-compile script.

11. The system according to claim 8, wherein said unified build frontend (12) generates said at least one resultant command line by performing at least one of the following actions:

Replacing, deleting and appending components (22, 24, 25, 26, 28) of a corresponding origin command line (20).

12. The system according to claim 8, wherein said at least one compiling tool (10) is a program invoked by said operating system (7) during processing of said at least one resultant command line preferably a high level language compiler or a program linker.

* * * * *